United States Patent
Sawchuk

(10) Patent No.: US 10,260,537 B2
(45) Date of Patent: *Apr. 16, 2019

(54) PIPE ASSEMBLY WITH STEPPED FLOW CONDITIONERS

(71) Applicant: Canada Pipeline Accessories, Co. Ltd., Calgary (CA)

(72) Inventor: Daniel A. Sawchuk, Chestermere (CA)

(73) Assignee: Canada Pipeline Accessories, Co., Ltd., Calgary, Alberta (CA)

(*) Notice: Subject to any disclaimer, the term of this patent is extended or adjusted under 35 U.S.C. 154(b) by 63 days.

This patent is subject to a terminal disclaimer.

(21) Appl. No.: 15/120,542

(22) PCT Filed: Mar. 18, 2015

(86) PCT No.: PCT/CA2015/050199
§ 371 (c)(1),
(2) Date: Aug. 22, 2016

(87) PCT Pub. No.: WO2015/139131
PCT Pub. Date: Sep. 24, 2015

(65) Prior Publication Data
US 2017/0009788 A1    Jan. 12, 2017

Related U.S. Application Data

(60) Provisional application No. 61/968,006, filed on Mar. 20, 2014.

(51) Int. Cl.
*F15D 1/00* (2006.01)
*F15D 1/02* (2006.01)
(Continued)

(52) U.S. Cl.
CPC ........... *F15D 1/025* (2013.01); *F15D 1/0005* (2013.01); *G01F 15/00* (2013.01); *G01F 1/662* (2013.01)

(58) Field of Classification Search
CPC ...................................................... F15D 1/025
(Continued)

(56) References Cited

U.S. PATENT DOCUMENTS 3,545,492 A    12/1970    Scheid
3,838,598 A    10/1974    Tompkins
(Continued)

FOREIGN PATENT DOCUMENTS

CA    2171828        3/1995
CA    2138686 A1    8/1995
(Continued)

OTHER PUBLICATIONS

Extended European Search Report, PCT/CA2015050199, dated Nov. 6, 2017.
(Continued)

*Primary Examiner* — Craig M Schneider
*Assistant Examiner* — David R Deal
(74) *Attorney, Agent, or Firm* — Cahn & Samuels, LLP

(57) ABSTRACT

A pipe assembly for flow measurement characterized by a fluid flow pipe and two or more flow conditioners each having a stepped configuration and disposed in series within the fluid flow pipe in an orientation substantially perpendicular to an axis of the fluid flow pipe.

14 Claims, 8 Drawing Sheets

(51) Int. Cl.
*G01F 15/00* (2006.01)
*G01F 1/66* (2006.01)

(58) Field of Classification Search
USPC .................. 138/44, 40, 37, 42, 114, 115
See application file for complete search history.

(56) References Cited

U.S. PATENT DOCUMENTS

| | | | |
|---|---|---|---|
| 3,996,025 A | 12/1976 | Gulden | |
| 4,715,395 A | 12/1987 | Mainelli et al. | |
| 5,327,941 A | 7/1994 | Bitsakis et al. | |
| 5,341,848 A | 8/1994 | Laws | |
| 5,400,828 A | 3/1995 | Ziu et al. | |
| 5,495,872 A | 3/1996 | Gallagher et al. | |
| 5,529,093 A | 6/1996 | Gallagher et al. | |
| 5,606,297 A | 2/1997 | Phillips | |
| 5,762,107 A | 6/1998 | Laws | |
| 5,959,216 A | 9/1999 | Hocquet et al. | |
| 6,029,912 A | 2/2000 | Woolley | |
| 6,494,105 B1 | 12/2002 | Gallagher | |
| 6,647,806 B1 * | 11/2003 | Estrada | G01F 1/662 |
| | | | 73/861.28 |
| 6,651,514 B2 | 11/2003 | Zanker | |
| 6,807,986 B2 | 10/2004 | Boger | |
| 6,851,322 B2 | 2/2005 | Gallagher | |
| 7,073,534 B2 | 7/2006 | Sawchuk et al. | |
| 7,089,963 B2 | 8/2006 | Meheen | |
| 7,464,611 B2 | 12/2008 | Matter et al. | |
| 7,845,688 B2 | 12/2010 | Gallagher et al. | |
| 8,132,961 B1 | 3/2012 | England et al. | |
| D697,581 S | 1/2014 | Sawchuk et al. | |
| D701,939 S | 4/2014 | Sawchuk et al. | |
| 8,763,644 B2 | 7/2014 | Tsai et al. | |
| D721,417 S | 1/2015 | Sawchuk et al. | |
| 9,605,695 B2 * | 3/2017 | Sawchuk | F15D 1/025 |
| 2004/0055816 A1 | 3/2004 | Gallagher et al. | |
| 2005/0178455 A1 | 8/2005 | Cancade et al. | |
| 2005/0205147 A1 | 9/2005 | Sawchuk et al. | |
| 2006/0096650 A1 | 5/2006 | Sawchuk et al. | |
| 2008/0023086 A1 | 1/2008 | Fagerlund et al. | |
| 2008/0037366 A1 | 2/2008 | Smith | |
| 2008/0246277 A1 | 10/2008 | Gallagher et al. | |
| 2009/0277974 A1 | 11/2009 | Citrawireja et al. | |
| 2010/0024910 A1 | 2/2010 | Nakamori et al. | |
| 2011/0076628 A1 | 3/2011 | Miura et al. | |
| 2011/0174407 A1 | 7/2011 | Lundberg et al. | |
| 2011/0174408 A1 | 7/2011 | Lundberg et al. | |
| 2012/0247223 A1 | 10/2012 | Sawchuk et al. | |
| 2013/0111969 A1 | 5/2013 | Ellsworth | |
| 2014/0110094 A1 | 4/2014 | Duran | |
| 2014/0196535 A1 | 7/2014 | Sawchuk et al. | |
| 2015/0083262 A1 | 3/2015 | Van Buskirk | |
| 2016/0061372 A1 | 3/2016 | Sawchuk | |

FOREIGN PATENT DOCUMENTS

| | | |
|---|---|---|
| CA | 2228928 | 8/1995 |
| CA | 2679650 A1 | 10/2008 |
| CA | 2787659 | 7/2011 |
| CA | 2771728 A1 | 9/2012 |
| CN | 2903927 Y | 5/2007 |
| GB | 1469648 | 4/1977 |
| JP | 55159831 S | 12/1980 |
| WO | 2014040191 A1 | 3/2014 |
| WO | 2014110673 A1 | 7/2014 |
| WO | 2014186883 A1 | 11/2014 |

OTHER PUBLICATIONS

English Abstract of CN 2903927 Y, dated May 23, 2007.
International Preliminary Report on Patentability for PCT International Application PCT/CA2015/050199, dated Jun. 23, 2016.
English Abstract of JPS55159831.

* cited by examiner

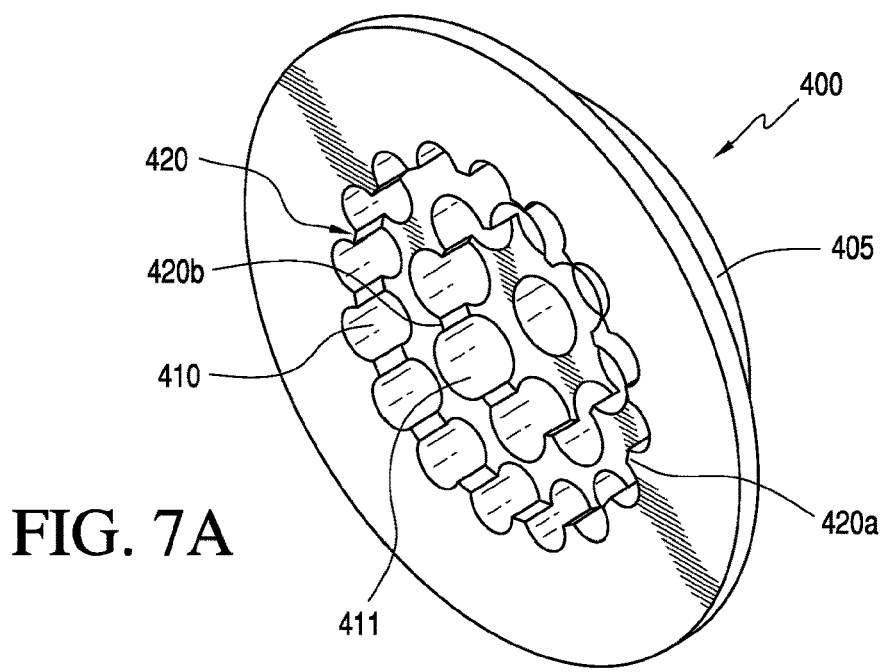
FIG. 7A
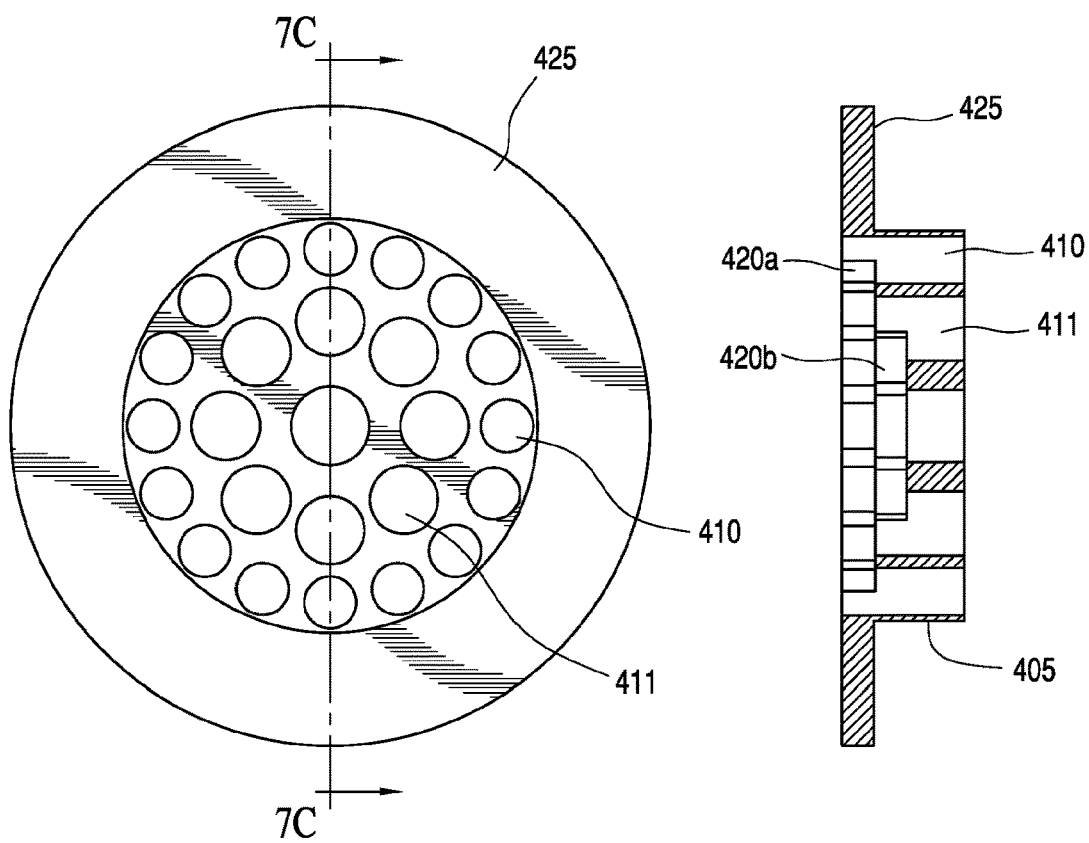
FIG. 7B
FIG. 7C

PIPE ASSEMBLY WITH STEPPED FLOW CONDITIONERS

I. CROSS REFERENCE TO PRIOR APPLICATION

This is a U.S. national stage application of PCT international application PCT/CA2015/050199 filed on 18 Mar. 2015 and claims priority to U.S. Ser. No. 61/968,006 filed in the U.S. Patent and Trademark Office on Mar. 20, 2014. The entire contents of such prior application are incorporated herein by reference.

II. TECHNICAL FIELD

The present invention relates to fluid flow measurement components used in oil and gas pipelines. More particularly, the present invention relates to a pipe assembly with stepped flow conditioners and methods of using same.

III. BACKGROUND OF THE INVENTION

Pipelines are used to transport fluids in various industries, including chemical, oil and gas, and manufacturing. These industries use processes that require fluid flow rates to be accurately measured. These measurements are performed at locations known as meter stations using a variety of different meter types. These meters function in different ways, they can use: differential pressure of the fluid across an obstruction, ultrasonic signal travel times, turbine blade rotational speed, Coriolis forces, or even electrical and magnetic fields being generated due to bulk fluid movement. Almost all of these measurement methods require use of the fluid velocity distribution, known as a velocity flow profile.

To achieve the most accurate measurements, the flow profile of the fluid entering a metering device must be stable, non-rotating, and symmetric. This type of velocity distribution is known as a fully developed flow profile, and it forms naturally in very long lengths of uninterrupted straight pipe. However, having long lengths of straight pipe is impractical and cost prohibitive. As a result, meter station piping often contains elbows, tees, valves and other assemblies that distort the flow profile into an asymmetric, unstable, and distorted configuration. This makes it very difficult to measure the fluid flow rate in a consistently accurate and repeatable manner. Under these conditions, flow conditioners are needed to correct the flow profile of the fluid such that it forms a fully developed flow profile which allows accurate, repeatable measurements to be made.

Several types of flow conditioners exist, including straightening vanes, tube bundles, and perforated plates. These flow conditioners are placed within the pipe upstream of the flow meter. A typical perforated plate flow conditioner consists of a perforated metal plate that is arranged within a pipe orthogonal to the fluid flow, i.e., across the entire cross section of pipe. The perforations or holes in the flow conditioner cause the fluid flow to be redistributed such that it forms a fully developed flow profile. The placement of a flow conditioner upstream of the flow meter ensures that the flow is fully developed before it reaches the meter. This allows the meter to perform significantly more accurate and repeatable fluid flow measurements.

IV. SUMMARY OF THE INVENTION

The invention provides in an embodiment a pipe assembly for flow measurement, characterized by a fluid flow pipe and two or more flow conditioners each having a stepped configuration and disposed in series within the fluid flow pipe in an orientation substantially perpendicular to an axis of the fluid flow pipe.

The invention provides a further embodiment to any of the previous embodiments a pipe assembly characterized in that the two or more flow conditioners each comprises an outer ring extending from a first side of the flow conditioner and comprising a concentric ring of a plurality of holes defining fluid passages from the outer ring to a second side of the flow conditioner; at least one inner ring recessed or stepped from the outer ring and comprising a concentric ring of a plurality of holes defining fluid passages from the at least one inner ring to the second side of the flow conditioner; and a central hole or opening. The plurality of holes in the outer ring and the plurality of holes in the at least one inner ring provide fluid passages of unequal length from a first side of the flow conditioner to a second side of the flow conditioner.

The invention provides a further embodiment to any of the previous embodiments a pipe assembly characterized in that the central hole or opening is recessed or stepped from the at least one inner ring.

The invention provides a further embodiment to any of the previous embodiments a pipe assembly characterized in that a diameter of the central hole or opening may be greater than the diameters of the plurality of holes of the at least one inner ring, and the diameters of the plurality of holes of the at least one inner ring may be greater than the diameters of the plurality of holes of the outer ring.

The invention provides a further embodiment to any of the previous embodiments a pipe assembly characterized in that the central hole or opening may define a fluid length that is less than the fluid length or passages defined by the plurality of holes of the at least one inner ring, which is less than the fluid length of passages defined by plurality of holes of the outer ring.

The invention provides a further embodiment to any of the previous embodiments a pipe assembly characterized in that the two or more flow conditioners each comprises a first set of integral vanes at least partially following a contour or pattern of an outer ring of holes; and a second set of integral vanes at least partially following a contour or pattern of an inner ring of holes, wherein the second set of integral vanes is recessed or stepped from the first set of integral vanes.

The invention provides a further embodiment to any of the previous embodiments a pipe assembly characterized in that the two or more flow conditioners each having a stepped configuration are positioned at about 2-10 pipe diameters apart.

The invention provides a further embodiment to any of the previous embodiments a pipe assembly further characterized in that at least one pressure transmitter is installed upstream of, downstream of, or between the two or more flow conditioners each having a stepped configuration.

The invention provides a further embodiment to any of the previous embodiments a pipe assembly further characterized by a flow meter downstream of the two or more flow conditioners each having a stepped configuration.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the methods and systems should become evident to a person of ordinary skill in the art.

V. BRIEF DESCRIPTION OF THE DRAWINGS

FIG. 7A illustrates a perspective view of a first side of a flow conditioner according to a further embodiment having a flange on a first side; integral vanes on a first side that at least partly following contours of an outer ring of holes or apertures; and integral vanes on a first side that at least partly following contours of an inner ring of holes or apertures.

FIG. 7B illustrates a view of a second side of the flow conditioner of FIG. 7A.

FIG. 7C illustrates a cross sectional view of the flow conditioner of FIG. 7A.

Given the following enabling description of the drawings, the methods and systems should become evident to a person of ordinary skill in the art.

VI. DETAILED DESCRIPTION OF THE INVENTION

According to the present invention, a pipe assembly for flow measurement is characterized by a fluid flow pipe; and two or more flow conditioners each having a stepped configuration and disposed in series within the fluid flow pipe in an orientation substantially perpendicular to an axis of the fluid flow pipe.

The entire flow conditioner may be machined out of the same material to provide a unitary, integral structure, in contrast, for example, to flow conditioners that are welded together such as tube bundles.

Figure 1:
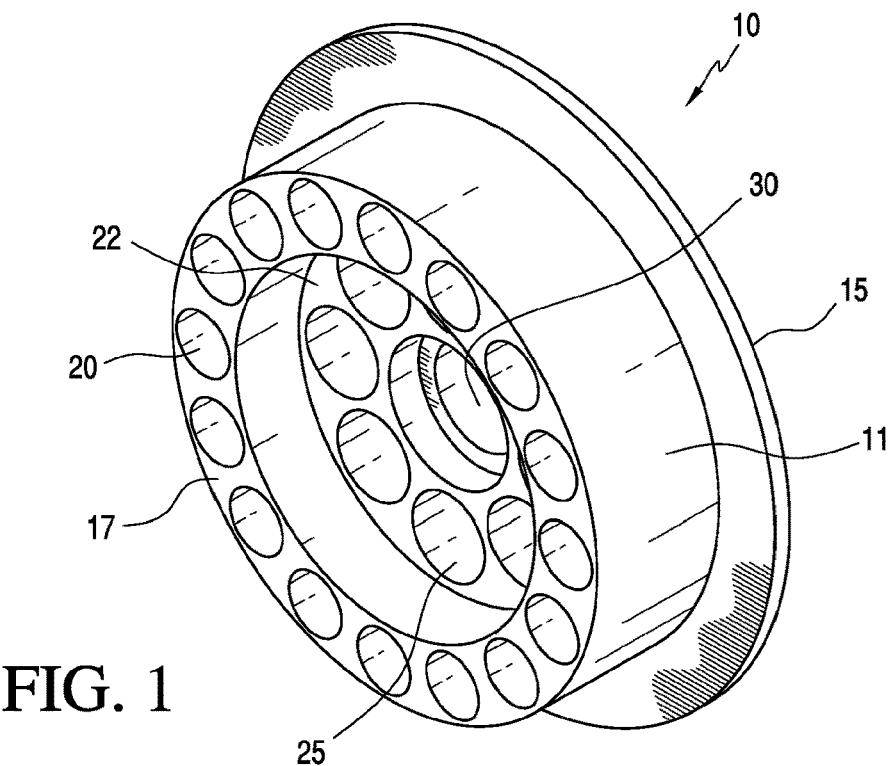
FIG. 1 illustrates a perspective view of a first side of a flow conditioner according to an embodiment of the present invention.
Figure 2:
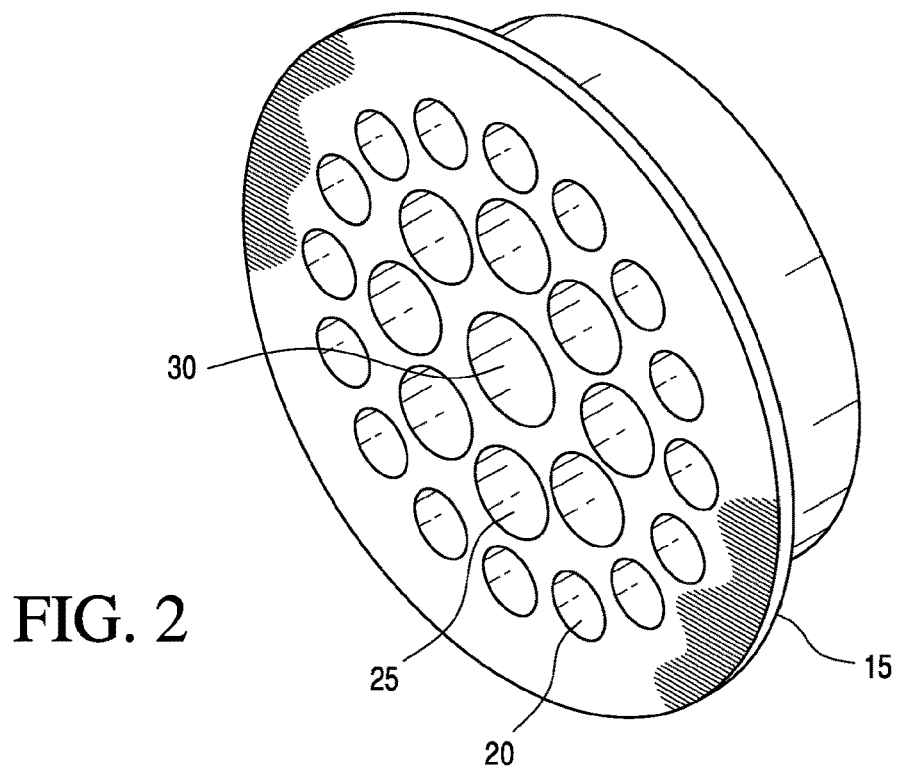
FIG. 2 illustrates a perspective view of a second side of the flow conditioner of FIG. 1.

According to an embodiment of the present invention, FIG. 1 illustrates a perspective view of a first side of a flow conditioner 10 comprising 1) a body or disk 11 and optional flange 15; 2) an outer ring 17 extending from the first side of the flow conditioner, and comprising a concentric ring of a plurality of holes 20 defining fluid passages from the outer ring to a second side of the flow conditioner; 3) at least one inner ring 22 recessed or stepped from the outer ring 17 and comprising a concentric ring of a plurality of holes 25 defining fluid passages from the at least one inner ring 22 to the second side of the flow conditioner; and 4) a central hole or opening 30 recessed or stepped from the at least one inner ring 22. The plurality of holes 20 in the outer ring 17 and the plurality of holes 25 in the at least one inner ring 22 provide fluid passages of unequal length from a first side of the flow conditioner to a second side of the flow conditioner. FIG. 2 illustrates a perspective view of the second side of FIG. 1.

As illustrated, the outer ring and at least one inner ring may comprise a concentric ring of circular holes. However, the holes may be of any effective shape.

In specific embodiments, the at least one inner ring may comprise a plurality or series of stepped, recessed concentric rings, each ring comprising a plurality of holes.

Figure 3:
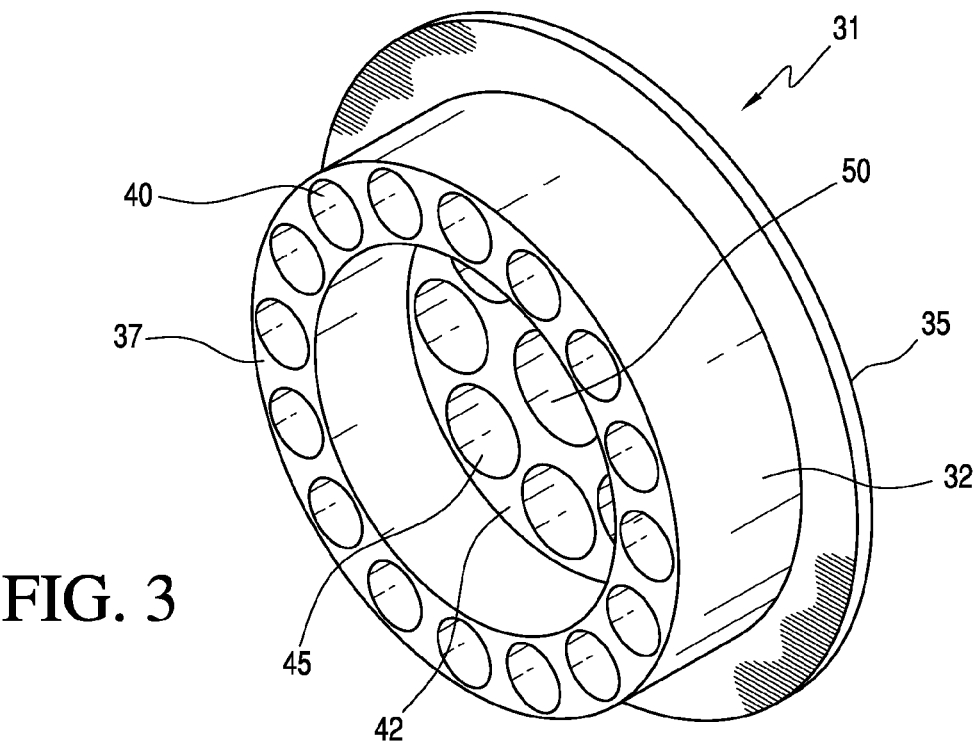
FIG. 3 illustrates a perspective view of a first side of a flow conditioner according to a further embodiment of the present invention.
Figure 4:
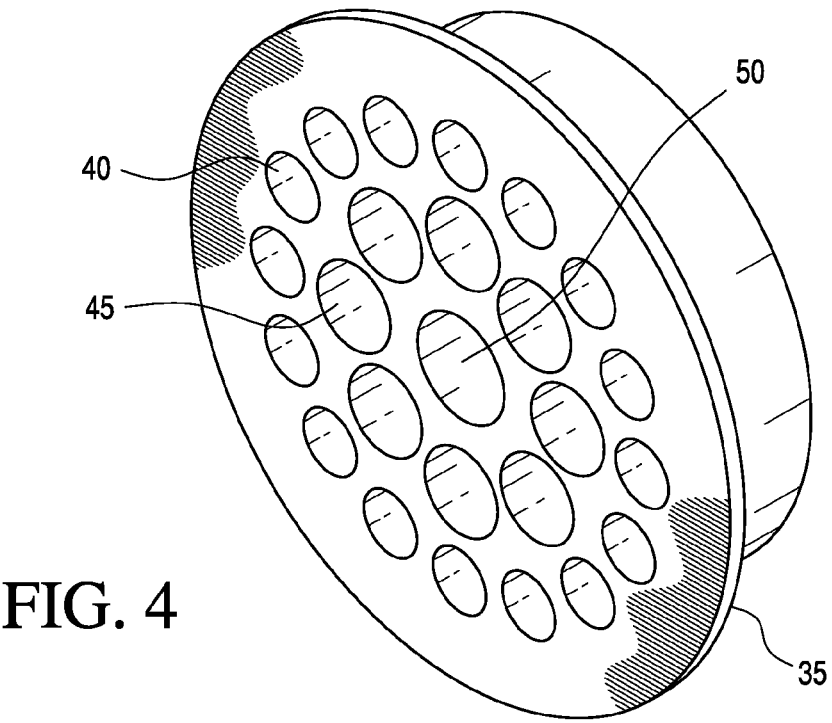
FIG. 4 illustrates a perspective view of a second side of the flow conditioner of FIG. 3.

According to a further embodiment, FIG. 3 illustrates a perspective view of a first side of a flow conditioner 31 comprising 1) a body or disk 32 and an optional flange 35; 2) an outer ring 37 extending from the first side of the flow conditioner and comprising a concentric ring of plurality of holes 40 defining fluid passages from the outer ring to a second side of the flow conditioner; 3) at least one inner ring 42 recessed or stepped from the outer ring 37 and comprising a concentric ring of a plurality of holes 45 defining fluid passages from the inner ring 42 to the second side of the flow conditioner; and 4) a non-recessed central hole or opening 50 within the at least one inner ring 42. FIG. 4 illustrates a perspective view of the second side of FIG. 3.

Figure 5:
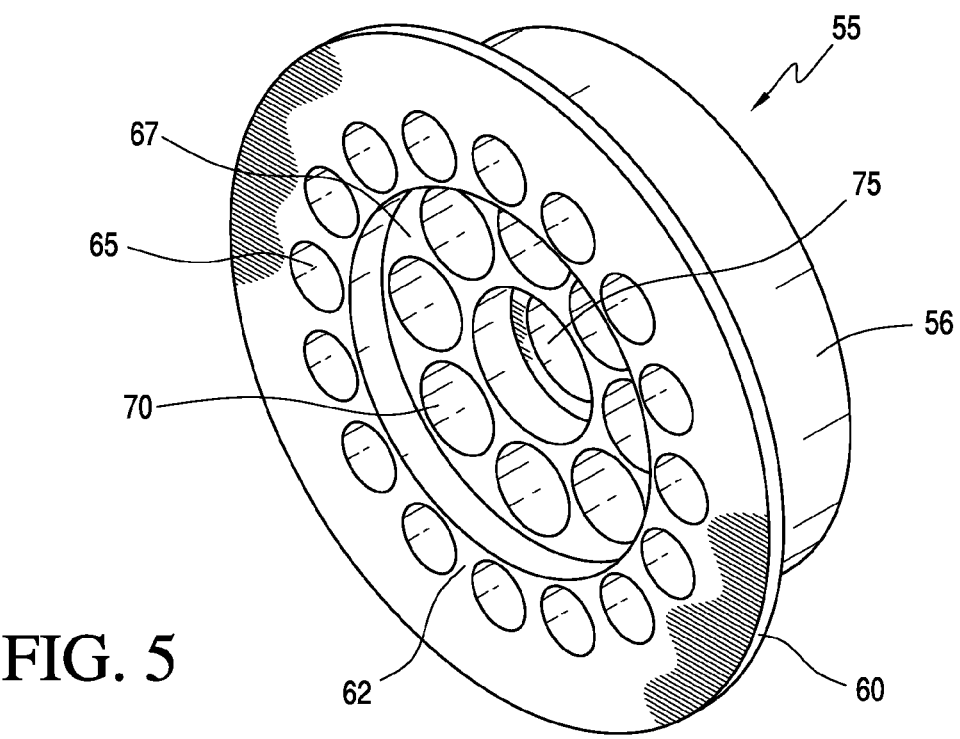
FIG. 5 illustrates a perspective view of a first side of a flow conditioner according to a further embodiment of the present invention.

According to a further embodiment, FIG. 5 illustrates a perspective view of a first side of a flow conditioner 55 comprising 1) a body or disk 56 and an optional flange 60; 2) an outer ring 62 extending from a first side of the flow conditioner and comprising a concentric ring of a plurality of holes 65, wherein the outer holes 65 define fluid passages from the outer ring to the second side of the flow conditioner; 3) at least one inner ring 67 comprising a concentric ring of a plurality of holes 70 and recessed or stepped from the outer ring 62, wherein the inner holes 70 define fluid passages from the inner ring to the second side of the flow conditioner; and 4) a central hole or opening 75 recessed or stepped from the at least one inner ring 67. The outer ring 62 may be integral with the optional flange.

Figure 6:
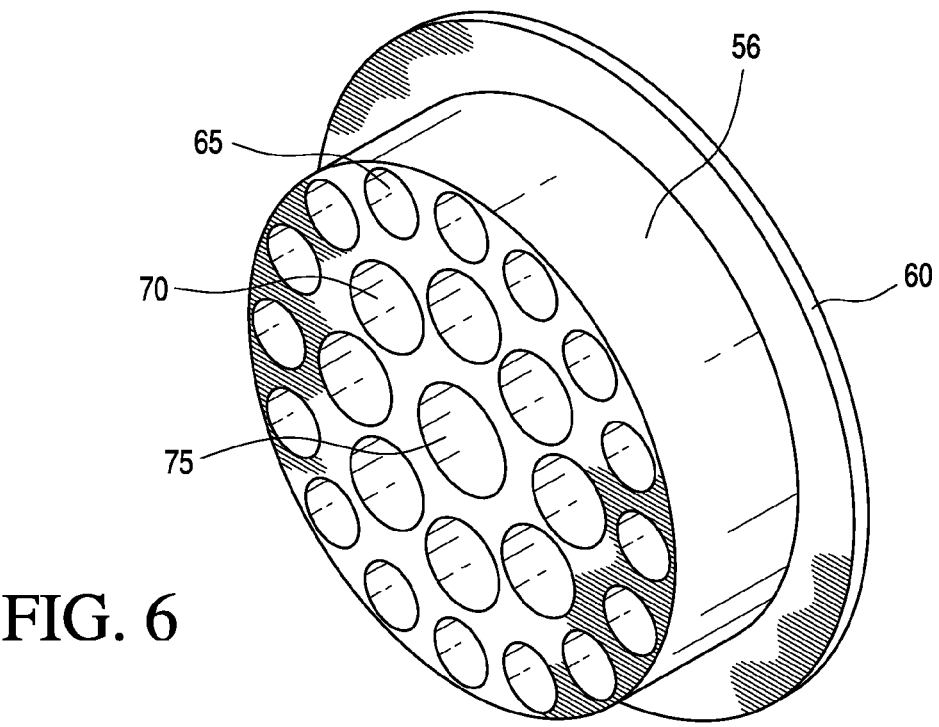
FIG. 6 illustrates a perspective view of a second side of the flow conditioner of FIG. 5.

The plurality of holes 65 in the outer ring and the plurality of holes 70 in the at least one inner ring provide fluid passages of unequal length from the first side of the flow conditioner to the second side of the flow conditioner. FIG. 6 illustrates a perspective view of the second side of FIG. 5.

In specific embodiments of the flow conditioners of FIGS. 1-6, a diameter of the central hole may be greater than the diameters of the plurality of holes of the at least one inner ring, and the diameters of the plurality of holes of the at least one inner ring may be greater than the diameters of the plurality of holes of the outer ring. The outer ring and at least one inner ring may have a flat or planar surface.

In specific embodiments of the flow conditioners of FIG. 1-6, the central hole may define a fluid length, which is less than the fluid length of passages defined by the plurality of holes of the at least one inner ring, which is less than the fluid length of passages defined by plurality of holes of the outer ring.

As shown in FIGS. 7A-7C, a flow conditioner 400 according to yet a further embodiment of the present invention may comprise a body or disk 405 comprising an outer ring comprising a plurality of holes 410, and having integral vanes 420 that are machined out of the same material as the body. A first set of integral vanes 420a follows at least part of the hole contour or pattern of an outer ring of holes 410. An inner ring comprises a second set of integral vanes 420b, similar to the first set 420a, that follow the hole contour or pattern of an inner ring of holes 411, but is recessed from the first set of integral vanes 420a (i.e., a stepped vane configuration). The integral vanes may be on a downstream side of a flow conditioner, on an upstream side of a flow conditioner, or on both sides of a flow conditioner. There flow conditioner may have a central hole or opening.

In specific embodiments, each integral vane 420a extends upward from between two outer holes 410, thereby defining a substantially flat inwardly-facing surface and two curved sides, each curved side defined by and integral with part of the circumference of an outer hole.

Each integral vane 420b on an inner ring of holes 411 extends upward between two holes, thereby having a substantially flat inwardly-facing surface and two curved sides, each curved side defined by and integral with part of the circumference of an inner hole.

The flange connection 425 shown in FIGS. 7B-7C is optional. The optional flange connection 425 may surround the flow conditioner or may be flush with an end (e.g., an upstream end/face or a downstream end/face) of the flow conditioner. As shown in the further embodiment of FIGS. 8A-8B, the optional flange 425 may be on an opposite side than that shown in FIGS. 7A-7C.

Figure 8A:
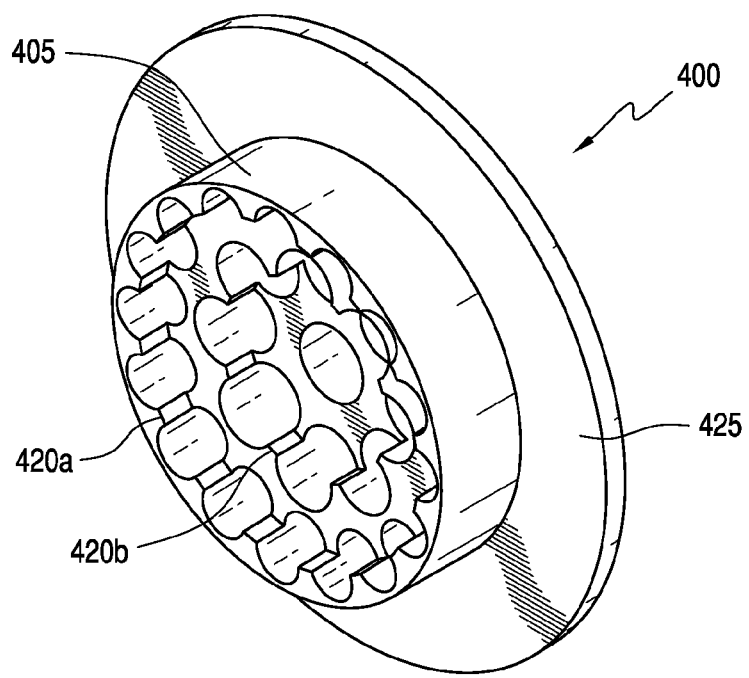
FIG. 8A illustrates a perspective view of a first side of a flow conditioner having a flange on an opposite side than the flow conditioner of FIG. 7A.
Figure 8B:
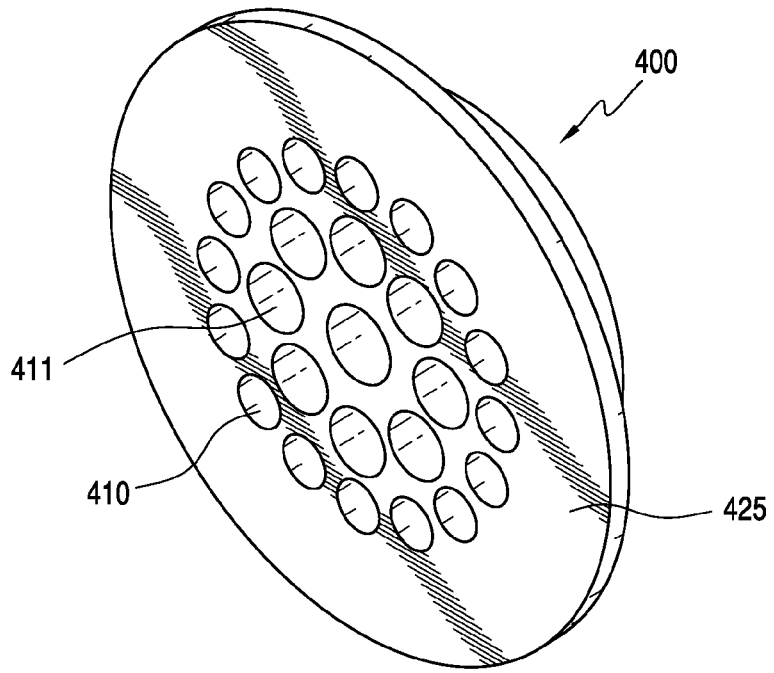
FIG. 8B illustrates a perspective view of a second side of the flow conditioner of FIG. 8A.
Figure 9:
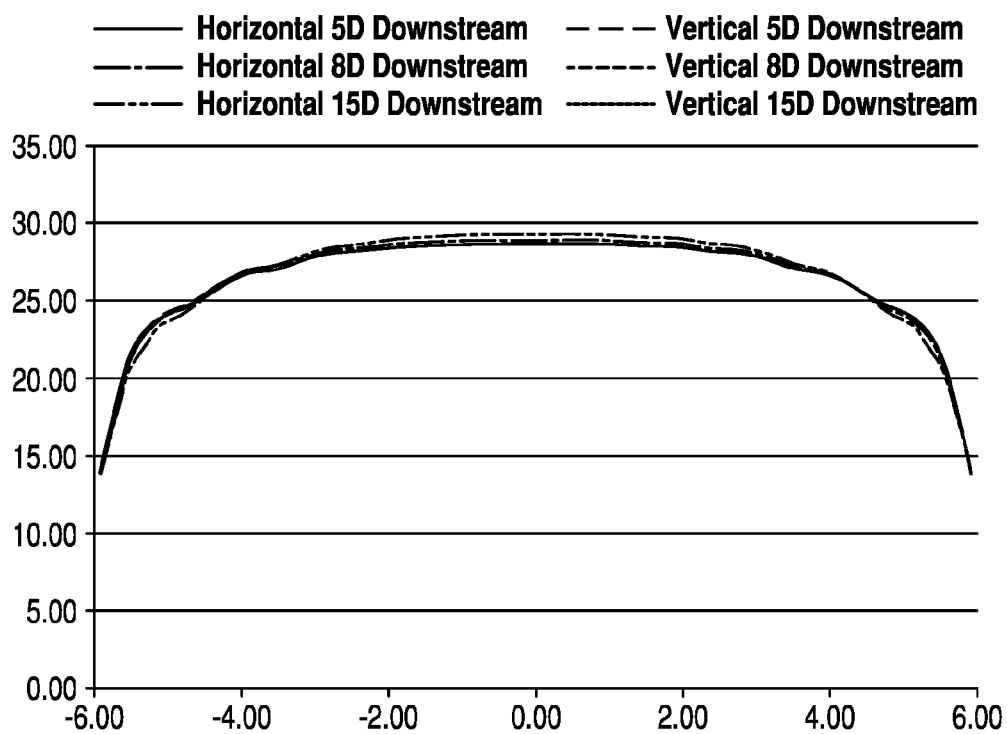
FIG. 9 is a graph showing a flow profile in a straight pipe with the flow conditioner of FIGS. 8A-B.

FIG. 9 is a graph showing a flow profile in a straight pipe with the flow conditioner of FIGS. 8A-B installed. All runs were done with natural gas as the fluid and with a 5 MPa outlet pressure. For a fluid having an initial fluid velocity of 25 m/s, FIG. 9 shows the fluid flow profiles measured horizontally (along a longitudinal axis of the length of the pipe in which the flow conditioner is installed) and vertically (along a transverse or perpendicular axis of the pipe) at distances downstream of the flow conditioner (i.e., 5 D, 8 D, and 15 D, measured in inside or internal pipe diameters). The vertical axis of the graph is the measured velocity in m/s and the horizontal axis of the graph is the diameter across a pipe (i.e., 0.00 is the center of the pipe having an approximately 12 inch cross section).

As shown in FIG. 9, the flow profile has a fully developed form at each measured distance (5 D, 8 D, and 15 D) and the illustrated flow lines substantially overlap.

Figure 10:
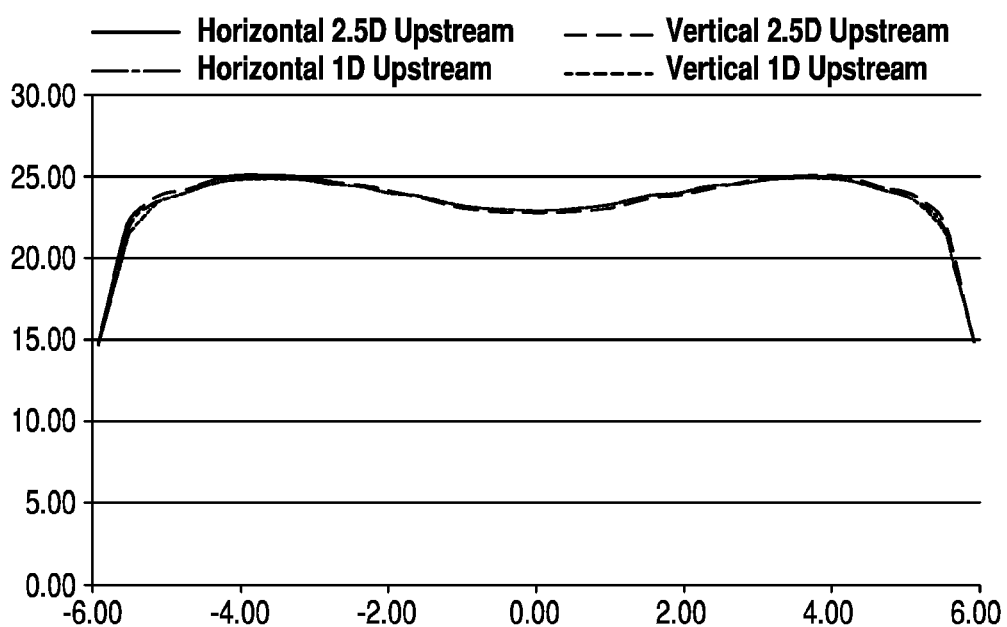
FIG. 10 is a graph showing a flow profile in an empty pipe, the fluid having 30 degrees of swirl.

FIG. 10 is a graph showing a flow profile in an empty pipe, the fluid having 30 degrees of swirl.

Figure 11:
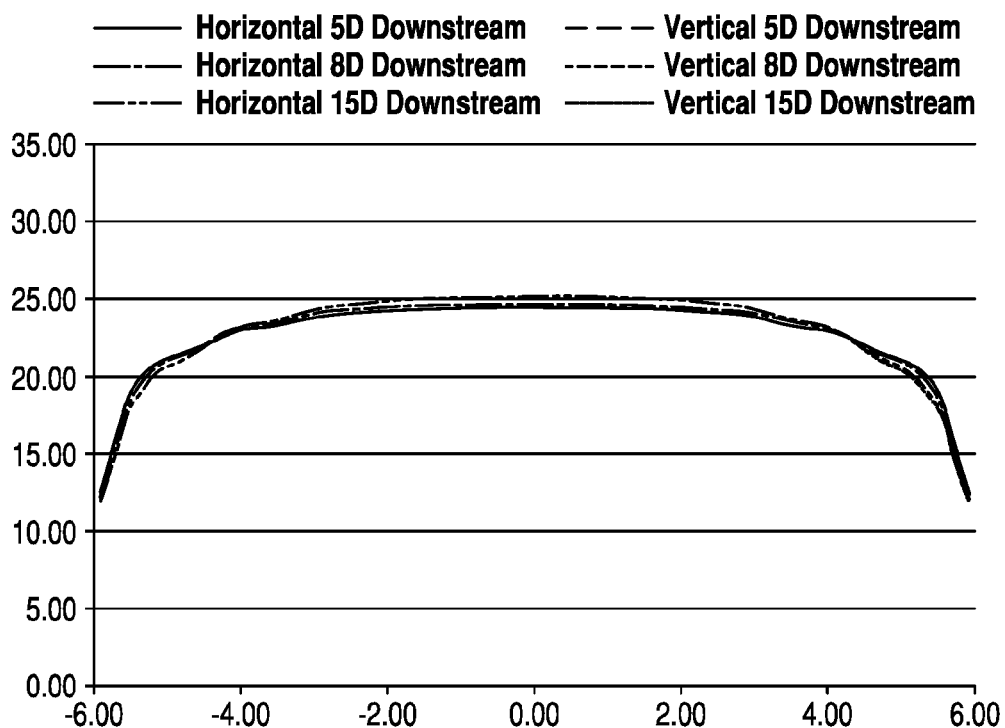
FIG. 11 is a graph showing a flow profile with the flow conditioner of FIGS. 8A-B, the fluid having 30 degrees of swirl.

FIG. 11 is a graph showing a flow profile in the pipe of FIG. 10 having the flow conditioner of FIGS. 8A-8B installed, the fluid having 30 degrees of swirl. Measurements were taken as described above with respect to FIG. 9. The flow profile has a fully developed form at each measured distance (5 D, 8 D, and 15 D) and the illustrated flow lines substantially overlap.

Figure 12:
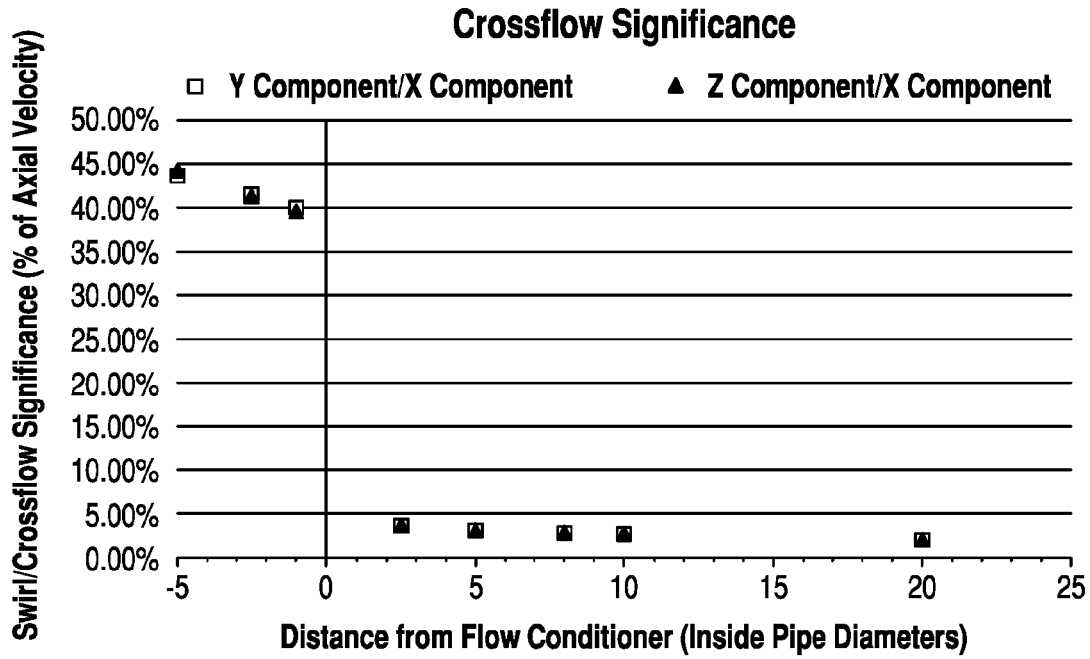
FIG. 12 is a graph showing the crossflow (swirl) significance with a flow conditioner of FIGS. 8A-B, the fluid having 30 degrees of swirl.

FIG. 12 is a graph showing the crossflow (swirl) significance in the pipe of FIG. 10 with a flow conditioner of FIGS. 8A-8B installed, the fluid having 30 degrees of swirl. The vertical axis is the swirl/crossflow significance (measured as a percentage of axial velocity) and the horizontal axis is the distance from the flow conditioner (measured in inside pipe diameters).

As shown in FIG. 12, the swirl/crossflow significance substantially drops downstream of the flow conditioner, which is installed at zero.

A. Installed in Series

According to the present invention, two or more flow conditioners each having a stepped configuration may be installed in series in a pipe upstream from a fluid flow meter. In specific embodiments, each flow conditioner has a thickness of about 0.05 D to about 0.5 D, where D is the pipe inside diameter, which may be ⅓ to ½ the thickness of other commercially-available flow conditioners.

Figure 13:
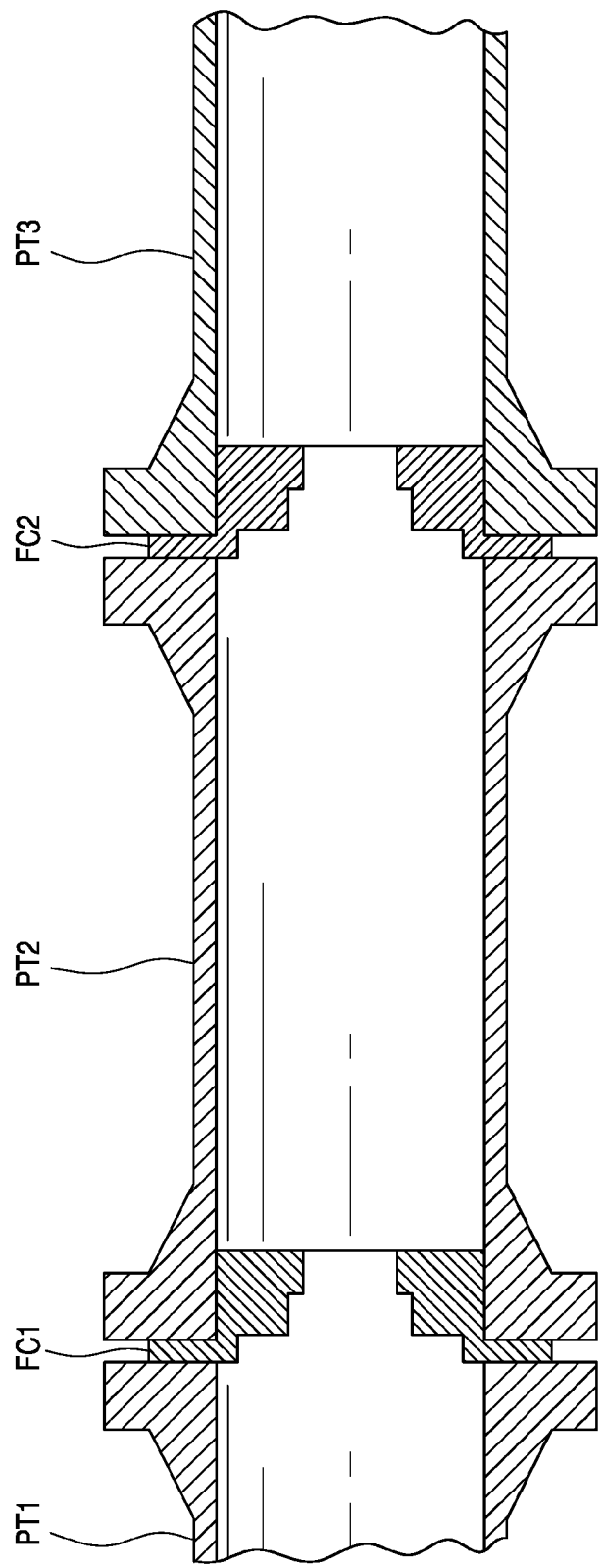
FIG. 13 is a schematic of two flow conditioners having a stepped configuration installed in series in a pipeline.

In specific embodiments, the stepped flow conditioners may be connected at various pipe distances, for example, at a pipe distance of about 2-10 pipe diameters apart (i.e., between flow conditioners). The stepped flow conditioners may be installed at different flanges that are in series in the pipeline, for example (FC1, FC2), as shown in FIG. 13.

B. Noise Reduction

Due to the locations of meter stations and pipelines, environmental and municipal noise restrictions must be met. Having a meter station be as quiet as possible is a large concern. Also, due to the increasing sensitivity of the ultrasonic flow meters, the noise levels of the flow conditioner can impact the flow meter performance itself.

An advantage of stepped flow conditioners is that they are quieter than known flow conditioners. Thus, multiple stepped flow conditioners may be used in series without turning into a noise generator/harmonic tube. The multiple use of the stepped flow conditioners allows for a severe reduction in noise.

C. Swirl Reduction

Known device configurations may include an anti-swirl device and a flow conditioner, for example as in U.S. Pat. No. 5,495,872. However, according to the present invention, the stepped flow conditioners achieve both results, reducing swirl and providing a more fully developed flow profile, thereby increasing flow meter accuracy. The present invention allows for a multistage removal of swirl and flow profile repair in a fluid pipeline. Each flow conditioner reduces error in the fluid, thereby increasing flow meter accuracy.

Instead of a single flow conditioner taking care of the entirely of the workload in the pipe, the work is divided up into steps. For example, a first flow conditioner may take or reduce 30% of the error caused by swirl and a second flow conditioner may take or reduce another 30% of the error caused by swirl. In specific embodiments, each flow conditioner results in about 50-90% reduction in fluid disturbances and swirl.

D. Pressure Transmitters

According to specific embodiments, at least one pressure transmitter may be installed (e.g., in the pipe spool) in at least one of: a point upstream of the two or more stepped flow conditioners, a point downstream of the two or more stepped conditioners, or between any two stepped flow conditioners (for example, PT1, PT2, PT3 as shown in FIG. 13).

The addition of pressure transmitters may allow for significant diagnostics of the performance of the flow conditioners by comparing, for example, the overall pressure drop across the flow conditioners (PT1 to PT3), to the discrete pressure drop performance across a first flow conditioner plate (PT1 to PT2) and a second flow conditioner plate (PT2 to PT3), as shown in FIG. 13. Pressure changes across the two or more stepped flow conditioners allow verification of whether either flow conditioner is damaged, plugged, trapping liquids, and the like.

In specific embodiments, the flow conditioners may be sized to pipe inside diameter D (0.85 D-0.99 D). In specific embodiments, a vane length may be about 0.10 D-5.25 D. In specific embodiments, an outer ring of vanes may end at between 0.70 D-0.95 D and an inner ring of vanes may be between about 0.35 D to 0.65 D.

The flow conditioner configuration according to the present invention may be utilized in existing piping without making modifications. In specific embodiments, the flow conditioners may have flanged connections, which are frequently available in meter stations. Thus, it is very simple and extremely compatible with meter station layouts.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

The invention claimed is:

1. A pipe assembly for flow measurement, comprising:
   a fluid flow pipe; and
   two or more stepped flow conditioners each comprising
      a perforated plate,
      an outer ring extending from a first side of the flow conditioner and comprising a concentric ring of a plurality of holes, wherein the holes define fluid passages from the outer ring to a second side of the flow conditioner,
      at least one inner ring recessed or stepped from the outer ring, said at least one inner ring comprising a concentric ring of a plurality of holes, wherein the holes define fluid passages from the at least one inner ring to the second side of the flow conditioner, and
      a central hole within the at least one inner ring and having a diameter greater than the diameters of the plurality of holes of the outer ring, wherein the central hole defines a fluid passage from the central hole to the second side of the flow conditioner, the fluid passage having a length which is less than the length of the fluid passages defined by the plurality of holes of the at least one inner ring,
   wherein each stepped flow conditioner is disposed in series within said fluid flow pipe in an orientation substantially perpendicular to an axis of said fluid flow pipe.

2. The pipe assembly according to claim 1, wherein the fluid passages defined by the plurality of holes of the outer ring and the plurality of holes of the at least one inner ring are of unequal length.

3. The pipe assembly according to claim 2, wherein the central hole is recessed or stepped from the at least one inner ring.

4. The pipe assembly according to claim 2, wherein a diameter of the central hole is greater than the diameters of the plurality of holes of the at least one inner ring, and the diameters of the plurality of holes of the at least one inner ring are greater than the diameters of the plurality of holes of the outer ring.

5. The pipe assembly according to claim 2, wherein the the fluid passages defined by the plurality of holes of the at least one inner ring have a length which is less than the length of the fluid passages defined by plurality of holes of the outer ring.

6. The pipe assembly according to claim 1, wherein the two or more flow conditioners having a stepped configuration are positioned at about 2-10 pipe diameters apart.

7. The pipe assembly according to claim 1, further comprising:
   at least one pressure transmitter configured to measure pressure drop within the pipe assembly.

8. The pipe assembly according to claim 1, further comprising:
   a flange connection surrounding a body of a flow conditioner.

9. The pipe assembly according to claim 1, further comprising:
   a flow meter downstream of the two or more flow conditioners having a stepped configuration.

10. The pipe assembly according to claim 1, wherein the two or more flow conditioners having a stepped configuration each have a thickness of about 0.05 D to 0.5 D, wherein D is the diameter of the fluid flow pipe.

11. The pipe assembly of claim 1, wherein the two or more flow conditioners are installed apart at different flanges that are in series in the pipeline.

12. The pipe assembly of claim 1, further comprising:
   a pressure transmitter installed upstream of, downstream of and between the two or more flow conditioners,
   wherein the pressure transmitters are configured to measure pressure changes across the two or more flow conditioners.

13. A method for reducing fluid swirl and noise in a pipeline, characterized by installing two or more flow conditioners each having a stepped configuration in a pipeline assembly according to claim 1, said two or more flow conditioners being positioned at about 2-10 pipe diameters apart in an orientation substantially perpendicular to an axis of said pipeline.

14. The method according to claim 13, further comprising:
   installing at least one pressure transmitter upstream of, downstream of, between the two or more flow conditioners each having a stepped configuration, the at least one pressure transmitter being configured to measure pressure drop within the pipe assembly.

* * * * *